Figure 1:
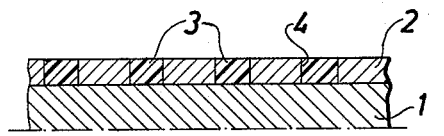
Figure 1:
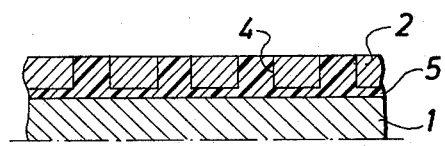
Figure 1:
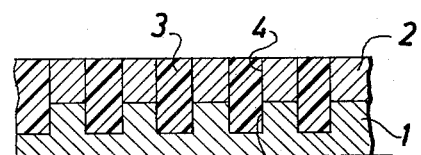
Figure 1:
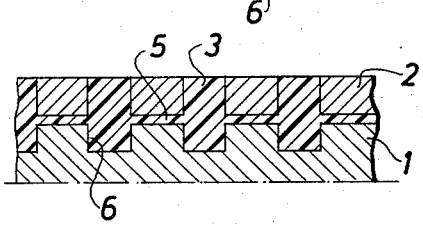
Figure 1:
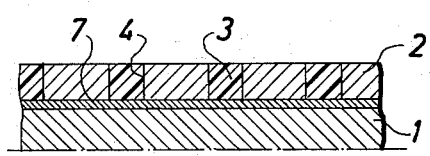
Figure 1:
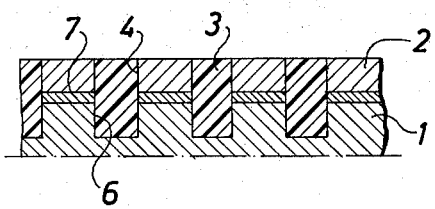

United States Patent [19]

Hagbjer

[11] 4,338,758

[45] Jul. 13, 1982

[54] VIBRATION DAMPED STRUCTURES AND OBJECTS

[75] Inventor: Gunnar Hagbjer, Malmö, Sweden

[73] Assignee: Reduc Acoustics AB, Sundyberg, Sweden

[21] Appl. No.: 143,668

[22] Filed: Apr. 25, 1980

Related U.S. Application Data

[63] Continuation of Ser. No. 897,306, Apr. 18, 1978, abandoned.

[51] Int. Cl.³ .............................................. E04B 1/00
[52] U.S. Cl. ...................................... 52/742; 52/393; 52/403; 188/268
[58] Field of Search ............... 52/396, 309.17, 309.12, 52/167, 403, 393, 742; 188/1 B, 268; 248/20, 634

[56] References Cited

U.S. PATENT DOCUMENTS

| | | | |
|---|---|---|---|
| 1,666,149 | 4/1928 | Rosenzweig. | |
| 2,212,142 | 8/1940 | Austin et al. | 248/22 |
| 2,256,984 | 9/1941 | Lemen et al. | 105/44 |
| 2,376,653 | 5/1945 | Boyer. | |
| 2,573,482 | 10/1951 | Peik | 52/396 X |
| 2,862,255 | 12/1958 | Nelson | 52/403 |
| 3,026,224 | 3/1962 | Rogers, Jr. | |
| 3,050,426 | 8/1962 | Stevens | 154/54 |
| 3,078,969 | 2/1963 | Campbell et al. | |
| 3,083,259 | 3/1963 | Wells | 174/68.5 |
| 3,144,228 | 8/1964 | Kass | 188/1 B |
| 3,262,251 | 7/1966 | Warnaka | 188/1 B |
| 3,436,042 | 4/1969 | Goubergen | 248/22 |
| 3,552,230 | 1/1971 | McLean | 74/574 |
| 3,790,078 | 2/1974 | Egerbork et al. | 238/2 |
| 3,828,504 | 8/1974 | Egerborg et al. | 52/396 |
| 3,956,563 | 5/1976 | Spang et al. | 428/327 |

*Primary Examiner*—Carl D. Friedman
*Attorney, Agent, or Firm*—James C. Wary

[57] ABSTRACT

Vibration energy is absorbed in a structure in which bores are formed in a rigid part and viscoelastic material is applied in the bores.

13 Claims, 13 Drawing Figures

VIBRATION DAMPED STRUCTURES AND OBJECTS

This is a continuation, of application Ser. No. 897,306, filed Apr. 18, 1978, now abandoned.

The present invention relates to vibration damped structures and objects, which normally emit substantial sound when set in vibration.

Structures, as related to here, could be structures made of common structural materials such as steel or other metals, concrete, including light concrete, plaster, wood, including structural parts manufactured of wood fibres or wood chips, as well as synthetic materials. Structures herein referred to can be buildings and parts thereof, such as frameworks, beams, slabs, walls and floors; constructional works, such as bridges; machines and engines.

Objects, as related to in this specification, could be e.g. continuously or intermittently rotating, oscillating or translatory moving objects, which due to their movement, or through strokes, blows or vibrations transmitted to same, are set in sympathetic vibrations and thereby emit sound. Circular saw blades, for instance, are an example of such rotating objects, which, as is known, by sawing emit substantial sound. Intermittently movable objects which due to blows emit sound, can be exemplified by rock drills for rock drilling machines.

Other objects, herein referred to, could be such, which due to turbulence or cavitation, possibly in combination with some other cause of vibration, when operating in fluids start oscillating, e.g. turbine blades and pump rotor blades.

Further objects related to herein, could be such which are immobile per se, but due to contact with a source of vibration can be set in sympathetic vibrations, e.g. engine foundations.

It is previously known to increase the inner damping in plates by applying a thin layer of viscoelastic material between two plates. Such a unit is usually called a sandwich plate. As a sandwich plate starts vibrating the two plates move relative each other, whereby shearing takes place in the viscoelastic layer adhering to the plates, which layer thereby absorbs a substantial part of the vibrating energy.

U.S. Pat. specification No. 3,828,504 discloses correspondingly damped structures of concrete and light concrete.

In the damped sandwich plates as well as the structures according to the cited Patent Specification the plates and the structure parts respectively are totally separated by the viscoelastic layer.

The Swedish Patent Specification No. 7407174-7 discloses structures, wherein partial damping layers are applied. Also in certain embodiments of the invention described therein the structure parts are separated from each other by the viscoelastic damping layer in such a manner that in each section through the structure at least two structure parts and possibly a viscoelastic damping layer can be distinguished.

For the damping of many structures and objects an application of the prior art is in practice unsuitable. Even if it is possible to achieve a satisfactory damping by employing the prior art, several applications imply that an active part of an object not without important disadvantages in its full extent can be divided into two or more parts with intermediate viscoelastic layers.

It is also known to damp structures and objects by applying, on a surface thereof, one or more damping fields in the form of a metal sheet or foil for damping structure borne noise provided with a viscoelastic damping layer comprising a self-adhesive glue.

The object of the present invention is partly to remove certain inconveniences with the prior art and partly to offer a substitute for the prior art in certain applications, which results in an equally good damping performance. According to the present invention this has been achieved in that the invention has been given the characterizing features set forth in the appended claims.

Figure 2:
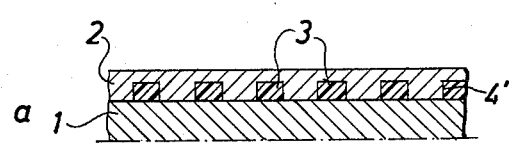
Figure 2:
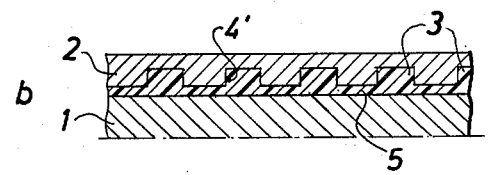
Figure 2:
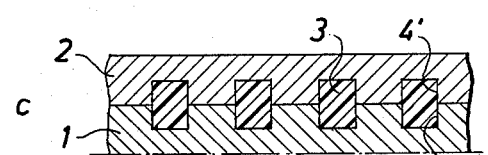
Figure 2:
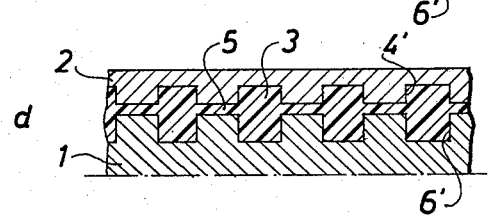
Figure 2:
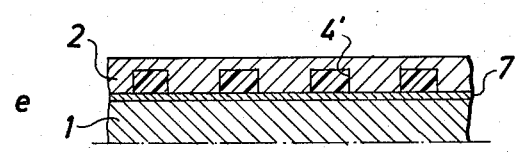
Figure 2:
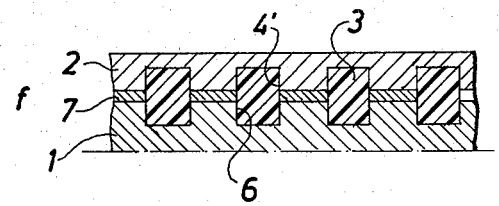
Figure 3:
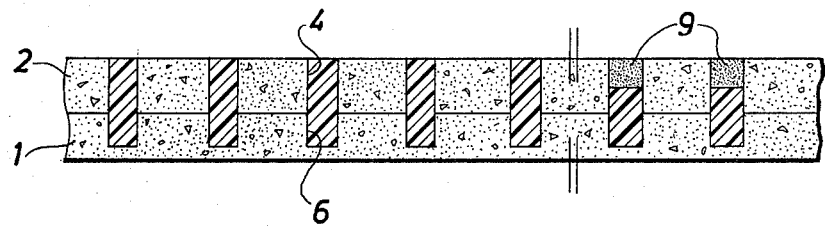
Figure 4:
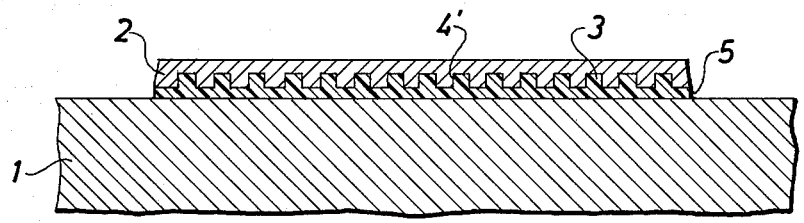
Figure 5:
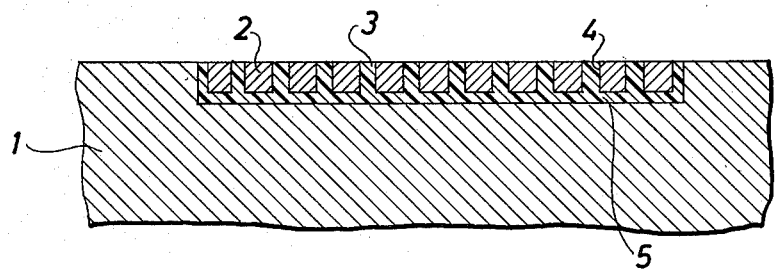
Figure 6:
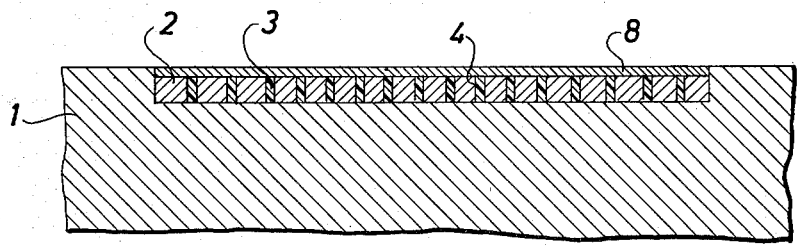
Figure 7:
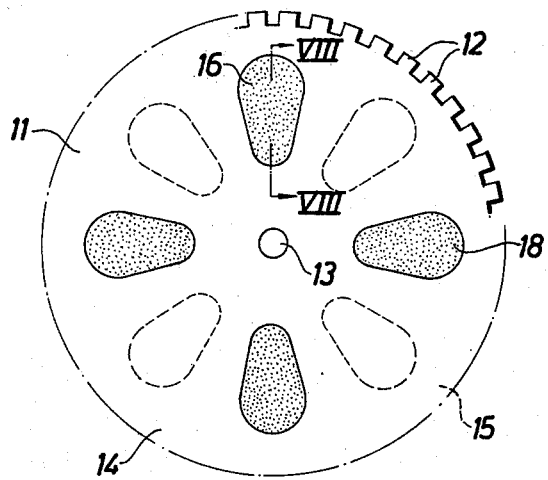
Figure 8:
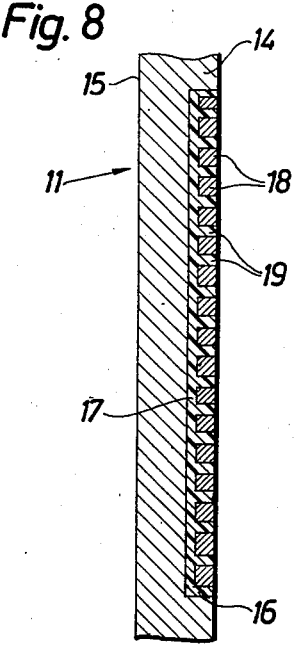
Figure 9:
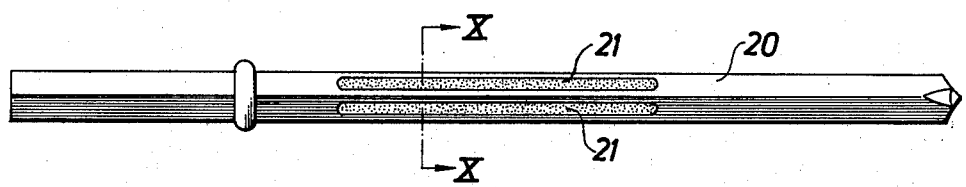
Figure 10:
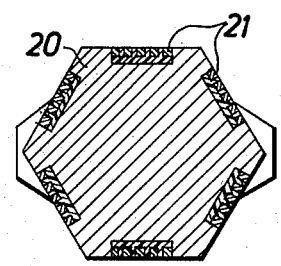
Figure 11:
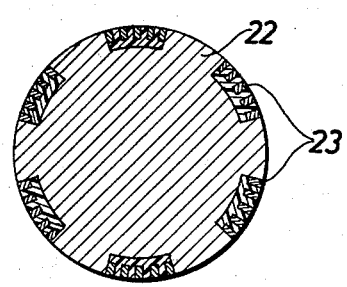
Figure 12:
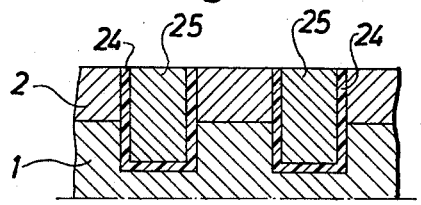
Figure 13:
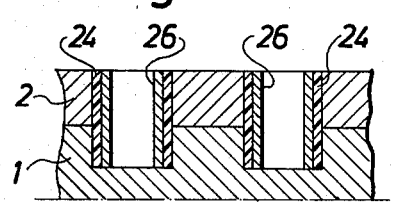

The invention is described more in detail below, reference being made to the accompanying drawings, wherein FIGS. 1a-f and FIGS. 2a-f show sections through different fundamental embodiments of the invention regarding the location of the viscoelastic damping material in a damped structure or object, FIG. 3 shows a section through an example according to the invention of a damped structure of concrete or light concrete, FIG. 4 shows a section through a damping field according to FIG. 2b applied outside a structure or object, FIG. 5 shows similarly a damping field according to FIG. 1b set in a structure or object, FIG. 6 shows a damping field arranged according to FIG. 1a, which is let into a structure or object and, furthermore, is provided with a covering layer, FIGS. 7-11 show examples of different damped objects in accordance with the invention, where FIGS. 7 and 8 show a part of and a section through a part of a saw blade, respectively, FIGS. 9 and 10 show a rock drill and on an enlarged scale a section through same, respectively, FIG. 11 shows a section through a cylindrical shaft, and FIGS. 12 and 13 show, respectively, a section through two additional fundamental embodiments of the invention.

In FIGS. 1a-f and 2a-f the reference numeral 1 refers to a part of a structure or object, 2 refers to a rigid structure part or a separate stiffening part arranged against part 1, and 3 refers to a viscoelastic damping material.

In FIG. 1a part 2 is provided with bores 4. The bores are filled with the viscoelastic material 3 adhering to the walls of the bores and to part 1. According to FIG. 1b the viscoelastic material 3, or another viscoelastic material, is applied not only in the bores 4 but also as a conventional damping layer 5 between the parts 1 and 2.

In FIG. 1c part 1 has been provided with dead-end bores 6 corresponding to the bores 4 in part 2 and the viscoelastic material 3 continuously fills up the respective bores 4 and 6 facing each other and adheres to the walls of the bores. According to FIG. 1d the viscoelastic material or another viscoelastic material, furthermore, has been arranged between the parts 1 and 2.

In FIG. 1e the same device as in FIG. 1a is shown, with the exception that a layer 7 of a non-viscoelastic material is placed between the parts 1 and 2. This layer 7 can, e.g. in certain applications, be electrically isolating, but, in any case, for the cooperation of parts 1 and 2, it has to be connected to part 1, e.g. through glueing, and the viscoelastic material 3 has to adhere to the layer 7. FIG. 1f shows the same arrangement of the viscoelastic material as FIG. 1c except in that a layer 7, corresponding to the layer of FIG. 1e, has been placed between the parts 1 and 2. In this latter case, the layer 7 does not need to and, in certain cases, should not adhere to any of the parts 1 and 2, but these are united by the viscoelastic material in the bores 4 and 6.

FIGS. 2a-f correspond to a respective one of FIG. 1a-f except for the bores 4' being dead-end bores, extending from the surface of part 2 facing part 1.

The embodiments according to FIGS. 1a-f have the advantage that the bores may be made after the parts 1 and 2 have been applied against each other; this is especially favourable in the embodiments according to FIGS. 1c, d and f, where the purpose is to achieve coaxial bores 4 and 6. Further advantages with the embodiments according to FIGS. 1a-1f are, firstly, that the viscoelastic material 3 can be filled into the bores, especially in the embodiments according to FIGS. 1a, c, e and f, after the parts have been placed against each other and, secondly, that if the viscoelastic material first is applied to part 1, as is suitably done in the embodiments according to FIGS. 1b and d, and thereafter part 2, provided with bores, is placed onto part 1, the bores 4 will contribute to avoid air entrapments between the parts 1 and 2 and thereby to achieve a better adhesion between the parts. Furthermore, gases, possibly formed when the viscoelastic material hardens, can escape through the bores 4, thus preventing such gases to cause overpressure and poorer adhesion between the parts.

Surprisingly enough the invention has proven to result in an equally good damping—and in many cases a considerably better damping—than prior art. The prior art with viscoelastic damping is based on the fact that, in consequence of vibration, shearing takes place between two spaced structure parts. If there is a viscoelastic layer between these parts, which layer adheres to the parts, the shearing movement is transmitted to this layer's border surfaces against the parts, whereby the shearing work in the viscoelastic material results in losses in the form of heat and the vibrations are damped. The losses as a rule become greater the bigger the shearing angle, i.e. the thinner—upto certain limits—the viscoelastic layer is. The reasons for achieving a surprisingly good damping even if the viscoelastic material, according to the invention, is placed in bores is not yet quite clear. One reason could be, especially in the embodiments according to FIGS. 1a-f with bores through part 2, that the bores themselves are deformed at the bending of the part in consequence of vibration, whereby also the viscoelastic material in the bores is deformed and, thus, absorbs energy. In order to obtain total damping, the distance between adjacent bores may not be greater than the bending wave length for the frequency to be damped. The bores should, preferably, extend from the surface between the parts and at least to half the thickness of the respective part. For damping of metal plates a degree of perforation less than 30% is preferred, while a degree of perforation of 1-2% has proven sufficient when damping light concrete.

Generally speaking the damping methods according to FIGS. 1a, b and e as well as FIGS. 2a, b and e are best suited for damping of metals, while the methods according to FIGS. 1c and f in particular and also FIGS. 2c and f are best suited for damping of such materials as concrete, light concrete and plaster.

As examples of experimental results the following can be mentioned:

I. Two concrete slabs with a length of 2.4 m, a width of 0.6 m and a thickness of about 7 cm were placed against each other (according to FIG. 1c) and ten evenly distributed bores with a diameter of about 15 mm were drilled through the upper slab and down to quite half the thickness of the lower slab. The bores were filled with a viscoelastic damping compound, which was allowed to harden during a certain period of time. After the hardening the slabs were excited and the damping was measured within the frequency-range of 100-1000 Hz. The result showed a total loss-factor of 0.17 at the resonance frequency (125 Hz) of the slab, which is to be compared to a loss-factor of 0.035 achieved by prior art.

II. Two plaster-boards with a length of 0.5 m, a width of 0.1 m and a thickness of 13 mm were placed against each other according to FIG. 1f, an intermediate layer 7 comprising felt was arranged between the boards and eight evenly distributed bores were drilled through the upper board and down to quite half the thickness of the lower board. The bores were filled with a viscoelastic damping compound, which was allowed to harden, whereafter the boards were excited and the damping was measured at the resonance frequency of the board of about 500 Hz. The result showed a total loss-factor of 0.25, which is to be compared to a loss-factor of 0.10 when damping according to prior art.

Conventional damping only results in damping of vibration oscillations perpendicularly to a surface of a board. The above mentioned experiments, however, have surprisingly proven that damping also takes place at excitation and oscillation in directions parallel to the plane of the slabs or boards.

One example of application of the invention is indicated in FIG. 3, which shows a section through two superimposed slabs 1 and 2 of concrete or light concrete. The damping material is applied according to FIG. 1c, i.e. in bores 4, which extend through the entire slab 2 and continues in bores 6, which bores reach down to quite a good half of the thickness of the slab 1. In the right hand portion of FIG. 3 is indicated that the damping material not necessarily has to fill more than quite half of the height of the bores in slab 2. The remainder of the bores can, thus, be filled with concrete or cement mortar.

The invention could be used for damping by limited damping fields, which are applied to or in a structure or an object. Examples of damping by limited damping fields are shown in FIGS. 4-6 (the same reference numerals as in FIGS. 1-2 being used), FIG. 4 showing a damping field arranged according to FIG. 2b and applied outside a structure or an object, FIG. 5 showing a damping field arranged according to FIG. 1b and let in a structure or an object in such a manner, that the surface of the part 2 is in alignment with the upper surface of the structure or object 1, and FIG. 6 showing a damping field arranged according to FIG. 1a and let to such a depth in the surface of a structure or an object, that a covering layer 8, e.g. a thin plate, applied on top of the damping field, is in alignment with the upper surface of the structure or object 1. The application of such a covering layer has shown to further improve the damping. An explanation hereof could be, that the covering layer prevents the bulge of the damping material in the bores, which is the consequence of the bending of the structure when vibrating, and, thus, that the damping material undergoes a certain loss-bringing compression instead of being allowed to expand freely and convexly out of the bores.

Some examples of damping objects of metal will now be described. FIGS. 7 and 8 show a saw blade 11, which can be a conventional one—e.g. for rock sawing—with teeth 12 and a shaft bore 13. Preferably in both the plane blade surfaces 14 and 15, parallel to each other, are evenly distributed milled recesses 16, the bottom surfaces of which are parallel to the surfaces 14 and 15 of the blade. In each recess is applied a layer of an adhesive viscoelastic material 17, preferably a hardening one of a two component type. Outside the viscoelastic layer 17 a perforated plate 18 is applied in each recess 16, the shapes of the plates corresponding or being similar to the respective recess 16. Further, the rigidity of the plates is greater than that of the layer 17. The combined thickness of the viscoelastic layers 17 and the plates 18 suitably should be such, that the plates 18 are aligned with or somewhat below the respective surface of the blade 11. The damping fields shown in FIG. 7 have more or less the shape of a longitudinal section of a pear and are distributed in four damping fields on each side of the blade, the damping fields on the two sides of the blade being displaced angularly relative each other. This is shown by the damping fields, indicated by dotted lines in FIG. 7, on the backside of the blade.

FIG. 8 shows on an enlarged scale a section along line VIII—VIII in FIG. 8, wherefrom appears that the viscoelastic material 17—except for being present between the blade 11 and the plate—during the manufacture has been pressed into the bores 19 to totally fill same as the plate was applied to the damping material not yet hardened.

FIGS. 9 and 10 show how an extended object can be damped. The object in this case is a drill 20 of a rock drilling machine. The cross section of the drill, as is shown in FIG. 10, is a regular hexagonal and in all of the six longitudinal side-surfaces of the drill damping fields 21 are let in according to FIG. 5. Depending on the length of the object, the frequency or frequencies to be damped and the location of antinode loops, several damping fields can be applied one after the other along the object.

FIG. 11 shows a cross section through an extended cylindrical shaft 22, in the periphery of which are shown six damping fields 23, similarly let in and applied evenly distributed. These are, as in the preceding case, extended in the longitudinal direction of the shaft.

In practical tests with a saw blade for rock sawing, damped according to the invention, a reduction of sound emitted from the blade by up to 18 dB(A) was achieved, which means a decrease to ⅛ of the level of acoustic pressure in comparison with an equal, not damped blade operated under equal conditions. The sound disturbance is thus perceived by the ear as about ¼ of the disturbance from a non-damped blade.

FIGS. 12 and 13 show sections through damped structures or objects embodying the invention, the viscoelastic material 24 being adhered to the outside of solid, rigid bodies 25, e.g. of steel, and to the outside of tubes 26 respectively. The bodies 25 and the tubes 26 are applied in bores in the structures or objects 2, 1 to enable the viscoelastic material 24 to adhere to the walls of the bores. These embodiments need less quantities of the viscoelastic material, than when said material totally fills the cross sections of the bores, as in the embodiments earlier described.

Normally, the thicknesses of the viscoelastic damping layers 5 are about 0.1–1 mm, while the cross sectional areas of the bores can vary depending on which material is to be damped, its rigidity etc.

The least complicated method is to make the bores circularly cylindrical, e.g. through drilling or punching, but a further improved effect could be achieved by giving the bores another geometrical form.

In spite of the fact that mainly symmetrical objects have been described here, the invention is equally applicable on non-symmetrical objects, as e.g. engine foundations. Likewise, objects with double bent surfaces can be damped in accordance with the invention.

I claim:

1. Vibration damping apparatus comprising a structure subject to vibrations, a rigid structure distinct from the structure subject to vibrations but bearing thereon such that the rigid structure participates in vibrational oscillations of the structure subject to vibrations, said rigid structure having a plurality of bores with axes substantially perpendicular to a border surface between said rigid structure and the structure subject to vibrations, and viscoelastic damping material applied in said bores in said rigid structure and extending therefrom at least to the border surface, said viscoelastic material adhering to the walls of said bores.

2. Vibration damping apparatus according to claim 1, wherein said bores extend entirely through said rigid structure.

3. Vibration damping apparatus according to claim 2, wherein a viscoelastic material is applied as a layer between the rigid structure and the structure subject to vibrations.

4. Vibration damping apparatus according to claim 2, further comprising a non-viscoelastic material placed between said rigid structure and the structure subject to vibrations.

5. Vibration damping apparatus according to claim 2, wherein said rigid structure is outside the structure subject to vibrations.

6. Vibration damping apparatus according to claim 2 wherein said rigid structure extends into the structure subject to vibrations.

7. Vibration damping apparatus according to claim 1, comprising a plurality of bores in the structure subject to vibrations, said bores being coaxial with the bores in said rigid structure, said viscoelastic material filling up said bores in the structure subject to vibrations and adhering to the walls thereof.

8. Vibration damping apparatus according to claim 7, wherein said bores in the structure subject to vibrations extend to a depth of at least half the thickness of the structure subject to vibrations.

9. Vibration damping apparatus according to claim 8, further comprising rigid elements in the bores and wherein said viscoelastic material adhesively is applied to outer surfaces of said rigid elements between the elements and the walls of said bores.

10. Vibration damping apparatus according to claim 1, wherein the viscoelastic damping material is applied in bores preformed in the rigid structure.

11. Vibration damping apparatus according to claim 1 wherein the bores have substantially cylindrical shapes.

12. Vibration damping apparatus according to claim 1 wherein said bores extend into the rigid structure to a depth equal to at least half the thickness of said rigid structure.

13. Vibration damping apparatus formed by a process comprising arranging a rigid structure to bear upon a structure subject to vibration such that the rigid structure participates in vibrational oscillations of the structure subject to vibration, forming a plurality of bores in said rigid structure extending to at least a border surface between said rigid structure and the structure subject to vibration, applying fluid viscoelastic damping material in said bores, and hardening the damping material to cause adherence between the material and the walls of the bores.

* * * * *